Patented Mar. 16, 1926.

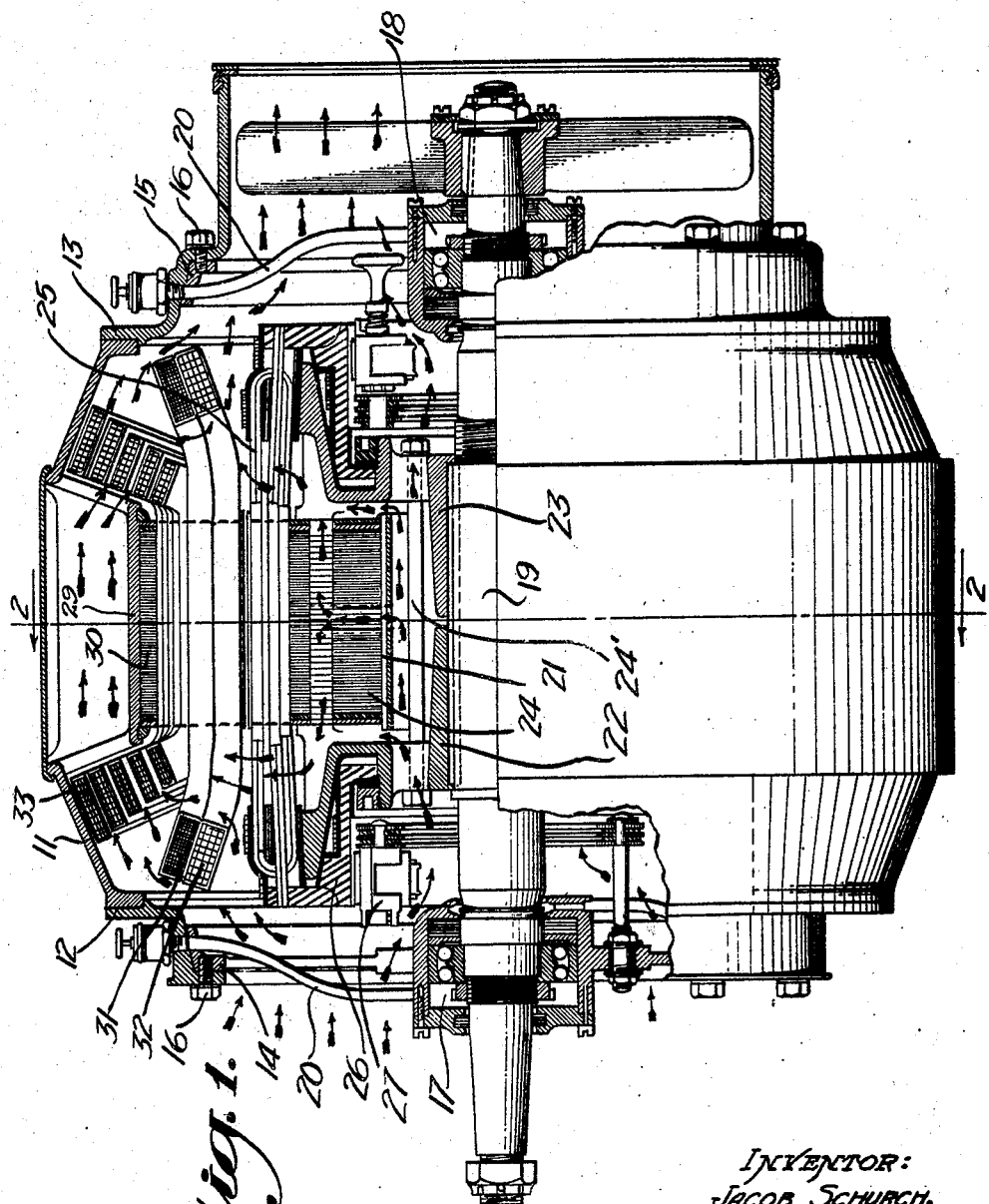

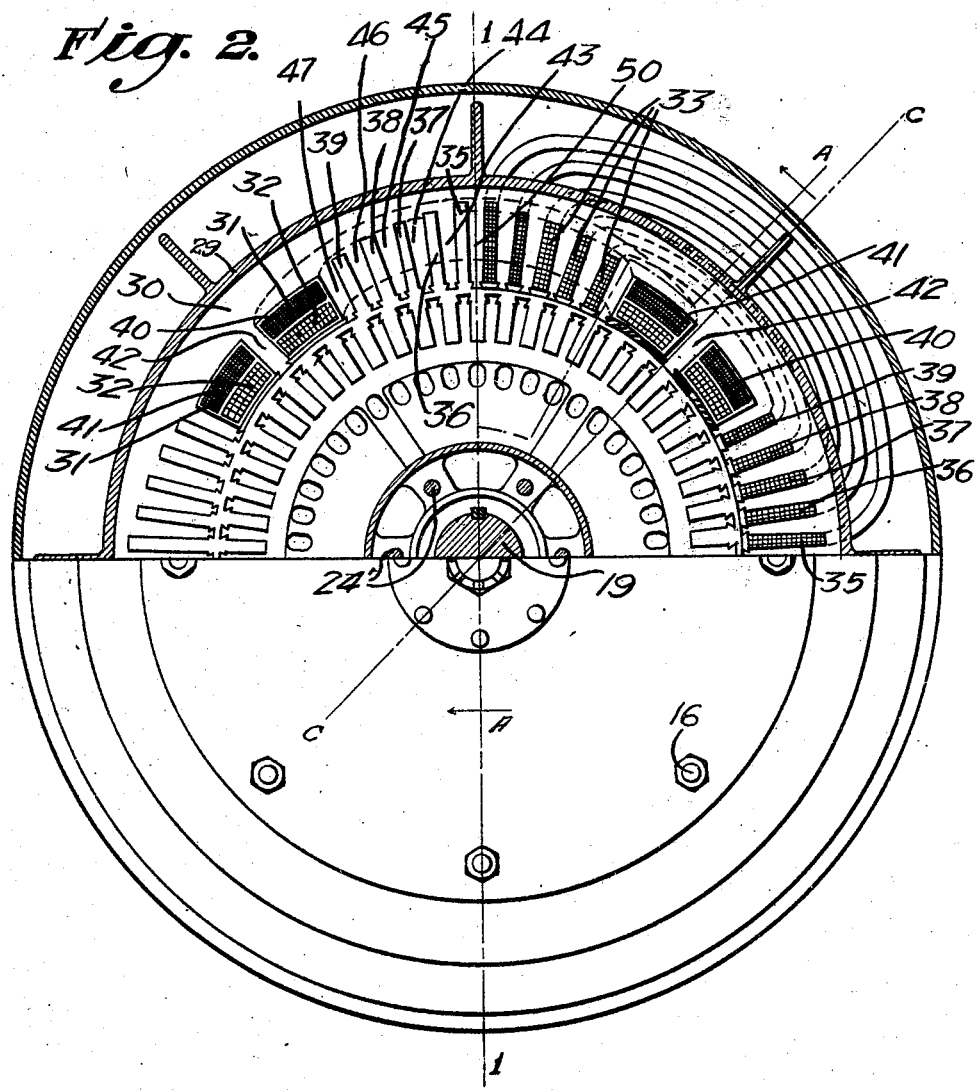

1,577,303

UNITED STATES PATENT OFFICE.

JACOB SCHURCH, OF LOS ANGELES, CALIFORNIA, ASSIGNOR OF ONE-HALF TO WILLIAM H. HEISE, OF LOS ANGELES, CALIFORNIA, AND ONE-HALF TO BENJAMIN C. TUNISON, OF PITTSBURGH, PENNSYLVANIA.

DYNAMO-ELECTRIC MACHINE.

Application filed October 16, 1922. Serial No. 594,794.

*To all whom it may concern:*

Be it known that I, JACOB SCHURCH, a citizen of the United States, residing in Los Angeles, in the county of Los Angeles, State of California, have invented a new and useful Improvement in Dynamo-Electric Machines, of which the following is a specification.

My invention relates to dynamo-electric machines and is particularly applicable to motors and generators utilizing direct current.

The principal object of the invention is to provide in a direct current dynamo-electric machine, a novel form of field structure.

A further object of the invention is to provide in such a machine a novel system of ventilation.

Further objects and advantages will be made evident hereinafter.

Referring to the drawing which is for illustrative purposes only, Fig. 1 is an elevation partly in section, taken substantially as indicated by the line A—A of Fig. 2.

Fig. 2 is an elevation partly in section in a plane represented by the line 2—2 of Fig. 1, portions of the windings being omitted for the sake of clearness.

The apparatus illustrated may be considered either as a direct current motor or as a direct current generator. In the following specification I will describe the invention as applied to a generator.

In the operation of direct current dynamo-electric machines, it is desirable to provide in the field structure a compensating winding for taking care of armature reaction, and it is also desirable to provide a commutating pole for the purpose of reversing the current under the brushes, and thus providing for sparkless commutation.

In the generator shown I provide a structure which accomplishes both of these results. In this structure I provide a housing 11, having end bells 12 and 13. Bearing brackets 14 and 15 are secured in the end bells by means of bolts 16, these bearing brackets carrying bearings 17 and 18, which support a shaft 19. The bearing structures 17 and 18 are shown of ball-bearing type, but may be of any convenient form, being lubricated through lubricating tubes 20. Mounted on the shaft 19 is an armature structure 21 which consists of end members 22 and 23 which are pulled together by bolts 24', and which are keyed and rigidly secured on the shaft 19. Secured between the members 22 and 23 are punchings 24 which are slotted to receive the armature coils 25. The members 22 and 23 also carry commutators 26 upon which brushes 27 rest. Openings are provided in the armature 21, as shown, and air is circulated through these openings in the direction of the arrows.

The field structure consists of punchings 30 mounted by a ring 29 in the housing 11, these punchings being optionally made from a ferruginous material carrying shunt field windings 31, series field windings 32, and compensating windings 33. Referring to Fig. 2, the punchings 30 are provided with compensating winding slots 35, 36, 37, 38, and 39, and with shunt and series field winding slots 40 and 41. The slots 40 and 41 are separated by commutating poles 42. The shunt and series coils 31 and 32 are each placed in the slots 40 and 41, that is to say, the coils 31 and 32 extend from a slot 40 to a slot 41 as shown by dotted lines in Fig. 2. This produces a field pole, having its center on the line 1—1 of Fig. 2, the strength of this pole depending upon the strength of current and the number of turns in the shunt and series coils 31 and 32. The compensating winding 33 is located in the slots 35 and 39 inclusive, each coil being connected between similarly numbered slots. It will be noted that the slots 35 are somewhat deeper than the other slots, and it is to be understood that a coil is to be placed in these slots, the center of these coils being along the line c—c of Fig. 2, this line being 45° from the line 1—1 and passing through the center of the commutating pole 42.

Due to the fact that the slots 35, 36, 37, 38, and 39, are progressively shallower, it should be noted that there remains beyond the end of these slots a constantly decreasing section of metal as the plane 1—1 is approached. Inasmuch as the main flux is symmetrical about the plane 1—1 it is evident that this construction can be adopted without producing an undue concentration of flux at any point. Or, to put it differently, it is evident that the cross-section of metal provided is adequate at all points for the flux, and this will be understood if we consider the fact that the only flux passing through the tooth 50, located on the plane 1—1, is the flux which passes around the end of the slots 35 and that as each tooth 43, 44, 45, 46, and 47 is considered, additional metal is added beneath the end of the slot to carry the flux delivered to that tooth. It is thus possible without undue concentration of flux to provide very deep slots at 35 and progressively shallower slots at 36, 37, 38, and 39, thus giving additional winding space which is utilized for the coils 33. It will also be seen that by providing the commutating pole in the position shown, this pole is excited by all of the windings 33 and the amount of flux passing through this pole is directly proportional to the current passing through the armature, since the compensating coils are connected in series with the armature.

I claim as my invention:

1. In a direct-current, dynamo-electric machine, a field structure comprising: a punching having slots arranged in pairs on either side of a radial plane, each successive pair of slots being deeper than the slots nearer said plane; and compensating coils arranged in and filling said slots.

2. A field structure as in claim 1 also comprising: a commutating pole situated on said plane and excited by said coils.

3. In a direct-current, dynamo-electric machine, a field structure comprising: a punching having slots arranged in pairs on either side of a radial plane, each successive pair of slots being deeper than the slots nearer said plane; and compensating coils arranged in and filling said slots, said field structure also comprising a commutating pole situated on said plane and excited by said coils, said field structure further comprising field coils, each of which is situated in a slot adjacent to another commutating pole.

4. A field structure for a dynamo-electric machine comprising: a ferruginous member; field coils, each coil being situated in two slots in said member which are situated on either side of a radial plane; and a compensating winding, situated in slots in said member, each of said slots being deeper than the next adjacent slot which is further away from said plane.

5. A combination as in claim 4, also comprising: commutating poles formed on said members between said field coils.

In testimony whereof, I have hereunto set my hand at Philadelphia, Pennsylvania, this 4th day of Oct. 1922.

JACOB SCHURCH.